(12) United States Patent
Horling et al.

(10) Patent No.: US 8,688,704 B1
(45) Date of Patent: *Apr. 1, 2014

(54) USER FEEDBACK IN PEOPLE SEARCH CLUSTERING

(75) Inventors: Bryan Horling, Sunnyvale, CA (US); Jun Gong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/953,873

(22) Filed: Nov. 24, 2010

(51) Int. Cl.
*G06F 17/30* (2006.01)

(52) U.S. Cl.
USPC ........... 707/737; 707/706; 707/722; 707/758; 709/204

(58) Field of Classification Search
USPC .......... 707/706, 722, 736, 758, 999.001, 737; 709/204
See application file for complete search history.

(56) References Cited

U.S. PATENT DOCUMENTS

| | | | | |
|---|---|---|---|---|
| 2005/0080657 A1* | 4/2005 | Crow et al. | ........................ | 705/8 |
| 2007/0067297 A1* | 3/2007 | Kublickis | .......................... | 707/9 |
| 2007/0174304 A1* | 7/2007 | Shrufi et al. | ................... | 707/100 |
| 2007/0271232 A1* | 11/2007 | Mattox et al. | ...................... | 707/3 |
| 2008/0040475 A1* | 2/2008 | Bosworth et al. | ............. | 709/224 |
| 2009/0248682 A1* | 10/2009 | Hueter et al. | ...................... | 707/5 |
| 2009/0306996 A1* | 12/2009 | Tsaparas et al. | ................... | 705/1 |
| 2009/0313102 A1* | 12/2009 | Le Roy et al. | ............. | 705/14.25 |
| 2010/0088265 A1* | 4/2010 | Pohl | ................................ | 706/46 |
| 2010/0125632 A1* | 5/2010 | Leonard | ........................ | 709/204 |
| 2010/0198773 A1* | 8/2010 | Wallisch | ......................... | 706/54 |
| 2010/0199219 A1* | 8/2010 | Poniatowski et al. | .......... | 715/825 |
| 2010/0211645 A1* | 8/2010 | Wang et al. | .................... | 709/206 |
| 2011/0173198 A1* | 7/2011 | Malleshaiah et al. | .......... | 707/737 |

OTHER PUBLICATIONS

U.S. Appl. No. 13/109,905, filed May 17, 2011, People Searching, Horling et al.

* cited by examiner

*Primary Examiner* — Dennis Truong
(74) *Attorney, Agent, or Firm* — Fish & Richardson P.C.

(57) ABSTRACT

Methods, systems, and apparatus, including computer programs encoded on a computer storage medium, for people search results. In general, one aspect of the subject matter described in this specification can be embodied in methods that include the actions of receiving a search query, the search query including one or more terms including an individual identifier; identifying search results associated with one or more individuals corresponding to the individual identifier in the search query, the search results identifying resources clustered according to the one or more individuals; presenting one or more search results; receiving user feedback associated with a presented search result; and processing the received feedback to determine whether to modify a cluster associated with the individual.

27 Claims, 11 Drawing Sheets

Aaron Brown, Jr - Corner Brook Electrical Contractors ☆
P.O. Box 2239, R.R. 1, Corner Brook, 1 Country Lane, Little Rapids NL ...
Corner Brook. Brown, Arron Jr. 75 George Aaron Drive, Deer Lake NL, ..
www.gs.gov.nl.ca/licenses/electrical/cornerbrook_electrical_contractors.pdf
Aaron Brown - LinkedIn - linkedin.com
Aaron Brown | Facebook - facebook.com
Aaron Brown (brownaaron) on Twitter - twitter.com
All 1137 related web results - Invite to Google+ - Feedback

Aaron Brown, Sr. - Plumbers - Fort Worth, Texas ☆
Email: 25 Years Experience Fort Worth, TX - Plumbers - Aaron Brown's
Plumbing Service .... Aaron's Rocket Rooter Plumbing 6200 Fort Worth ...
www.fortworth.com/plumbers/index.html
All 14 related web results - Invite to Google+ - Feedback Kevin Aaron Brown - Aaron B (Kevin A. Brown) | MySpace ☆
MySpace profile for Aaron Brown. Find friends, share photos, ... Status: Single;
Here for: Networking, Friends; Hometown: little rock ...
www.myspace.com/rockclimber875

Pittsburgh-Area BBSes - EServer Cyber/Tech Collection ☆
From: doug@epicycle.lm.com (Doug Luce) Subject: Re: Local BBS List Date: 22 Feb 1994
21:54:19 -0500 Aaron D. Brown (aaronb@telerama.lm.com) wrote: > A few ...
cyber.eserver.org/pitt_bbs.txt - Cached - Similar - Feedback Flickr: abrown ☆
About abrown / Nancy Brown. Photostream. spacer! ... Contacts (2).
amandakbrown Amanda Brown. nbrown Nancy Brown. Testimonials (0) ...
www.flickr.com/people/15203176@N00/ - Cached - Similar - Feedback Austin People Directory in Austin, TX | Spoke ☆
People Achkhine Baroyan - Aaron Katten in Spoke's business directory. ...
Aaron Brown. Company: Trilogy Enterprises - Aaron Butterworth ....
www.abrown.com/ - Cached - Similar - Feedback Personnel - Home | Modern Languages Department, Carnegie Mellon ... ☆
Additional programming, Aaron Brown Ben Fry Christopher M. Jones Matt McNally.
Richard Tseng. Spanish coordinator. Susan Polanski ...
ml.hss.cmu.edu/mirc/ola/spanish/SPPersonnel.html - Cached - Similar - Feedback Results related to other people named Aaron Brown ← 614

Aaron Brown - Wikipedia, the free encyclopedia ☆
Aaron Brown (born November 10, 1948) is an American broadcast journalist most
recognized ...
Career - in academia - References - External links
en.wikipedia.org/wiki/Aaron_Brown - Cached - Similar Q&A With Aaron Brown About His Post-CNN Plans -- New York Magazine ☆
Jun 1, 2008 ... Low-Key CNN anchor Aaron Brown was bumped aside in 2005 for
Anderson ...
nymag.com/news/intelligencer/47406/ - Cached - Similar ◀ Goooooooooooogle ▶
Previous    1 2 3 4 5 6 7 8 9 10 11 12 13    Next

Pittsburgh-Area BBSes - EServer Cyber/Tech Collection ☆
From: doug@epicycle.lm.com (Doug Luce) Subject: Re: Local BBS List Date: 22 Feb 1994
21:54:19 -0500 Aaron D. Brown (aaronb@telerama.lm.com) wrote: > A few ...
cyber.eserver.org/pitt_bbs.txt - Cached - Similar - Feedback Flickr: abrown ☆
About abrown / Nancy Brown. Photostream. spacer! ... Contacts (2).
amandabrown Amanda Brown. nbrown Nancy Brown. Testimonials (0) ...
www.flickr.com/people/15203176@N00/ - Cached - Similar - Feedback Austin People Directory in Austin, TX | Spoke ☆
People Achkhine Baroyan - Aaron Katten in Spoke's business directory. ...
Aaron Brown. Company: Trilogy Enterprises - Aaron Butterworth ....
www.abrown.com/ - Cached - Similar - Feedback Personnel - Home | Modern Languages Department, Carnegie Mellon ... ☆
Additional programming, Aaron Brown Ben Fry Christopher M. Jones Matt McNally.
Richard Tseng. Spanish coordinator, Susan Polanski ...
ml.hss.cmu.edu/mirc/cla/spanish/SPPersonnel.html - Cached - Similar - Feedback

---

Results related to other people named Aaron Brown

Aaron Brown - Wikipedia, the free encyclopedia ☆
Aaron Brown (born November 10, 1948) is an American broadcast journalist most
recognized ...
Career - In academia - References - External links
en.wikipedia.org/wiki/Aaron_Brown - Cached - Similar Q&A With Aaron Brown About His Post-CNN Plans -- New York Magazine ☆
Jun 1, 2008 ... Low-Key CNN anchor Aaron Brown was bumped aside in 2005 for
Anderson ...
nymag.com/news/intelligencer/47406/ - Cached - Similar ◀ Goooooooooooogle ▶
Previous  1 2 3 4 5 6 7 8 9 10 11 12 13  Next

FIG. 7 (Cont.)

USER FEEDBACK IN PEOPLE SEARCH CLUSTERING

BACKGROUND

This specification relates to people search results.

Internet search engines aim to identify resources (e.g., web pages, images, text documents, multimedia context) that are relevant to a user's needs and to present information about the resources in a manner that is most useful to the user. Internet search engines return a set of search results in response to a user submitted query. Unfortunately, the terms of a user submitted query may not align well with what the user has in mind, for example, if there is ambiguity in the meaning of the query terms. Even if the search results returned are relevant objectively to the user submitted query, the results may not be relevant to the user's actual subjective needs. For example, a user query can seek resources associated with a particular individual by including a name in a query. However, an individual can be associated with different types of resources that are not all equally relevant to the query and there can also be multiple individuals that share the same name.

SUMMARY

This specification describes technologies relating to people search results.

In general, one aspect of the subject matter described in this specification can be embodied in methods that include the actions of receiving a search query, the search query including one or more terms including an individual identifier; identifying search results associated with one or more individuals corresponding to the individual identifier in the search query, the search results identifying resources clustered according to the one or more individuals; presenting one or more search results; receiving user feedback associated with a presented search result; and processing the received feedback to determine whether to modify a cluster associated with the individual. Other embodiments of this aspect include corresponding systems, apparatus, and computer programs recorded on computer storage devices, each configured to perform the operations of the methods.

These and other embodiments can each optionally include one or more of the following features. Presenting the clustered search results further includes presenting search results according to cluster. Receiving user feedback includes feedback indicating that the search result is incorrectly clustered. Receiving user feedback includes flagging objectionable content in a clustered search result. Receiving user feedback includes confirming the identity of the individual associated with the search result. Processing the received feedback includes aggregating the feedback with feedback received from other users for the same search result. A determination is made to modify a cluster associated with the individual based on the overall weight of the aggregated feedback. Processing the received feedback includes assigning a weight to the feedback based on a quality measure for the user.

The weight of the feedback from the user is adjusted based on factors associated with the user. The factors associated with the user include a social connection between the user and the one or more individuals. The factors associated with the user include a reputation score of the user based on prior received feedback. Processing the received feedback includes assigning the feedback to a human operator for evaluation. Modifying a cluster includes adjusting cluster parameters such that one or more resources are no longer associated with a particular individual. Modifying a cluster includes generating an additional feature to be used in the clustering. The additional feature specifies a relationship between particular resources. The method further includes providing return feedback to the user in response to received user feedback.

Particular embodiments of the subject matter described in this specification can be implemented so as to realize one or more of the following advantages. People clustering accuracy can be improved using feedback from users. Users can also gain influence and a sense of control through the act of providing feedback.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Users can search for particular individuals by submitting a query, including a particular identifier, to a search system. The identifier can be a name, e.g., "Nicolas Sarkozy" or other identifier associated with an individual, for example, "president of France." Presented search results can include results associated with one or more individuals. These results can be clustered according to each particular individual based on one or more clustering techniques. In addition to search results, other metadata associated with the search results can be provided including pictures, keywords or other personally relevant information for the identified individual.

The presented search results can include one or more user interface elements allowing the user to provide feedback regarding one or more search results. The feedback include, for example, in indication that the result was correctly or incorrectly associated with a particular individual. The feedback can be analyzed to determine whether future clustering should be modified, for example, to decrease a likelihood of a search result with negative feedback from being included in a particular cluster.

Figure 1:
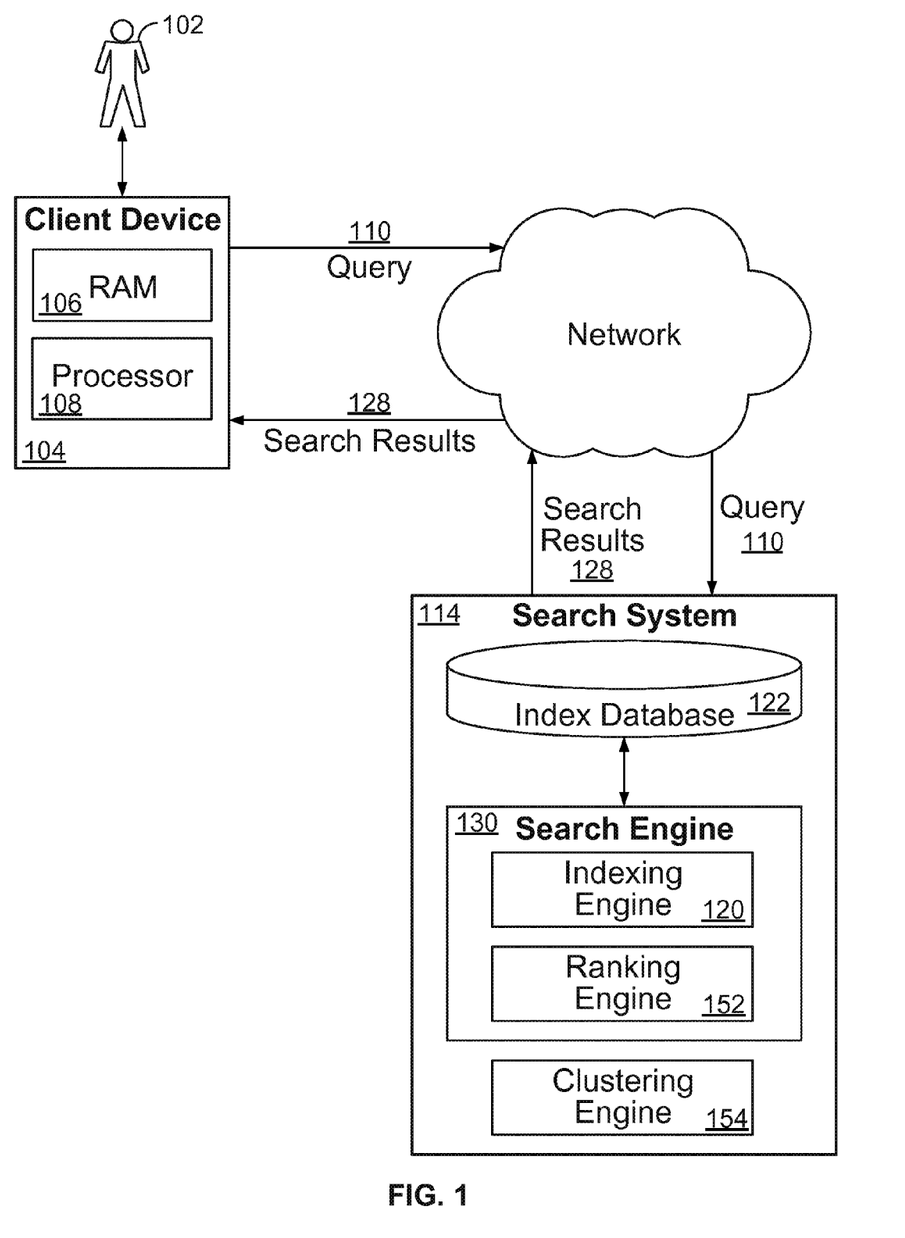
FIG. 1 shows an example search system.

FIG. 1 shows an example search system 104. The search system 104 provides search results relevant to submitted queries as can be implemented in an internet, an intranet, or another client and server environment. The search system 104 is an example of an information retrieval system in which the systems, components, and techniques described below can be implemented.

A user 102 can interact with the search system 104 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match, or are responsive to, the query 110. The search engine 130 will generally include an indexing engine 120 that indexes resources (e.g., web pages, images, or news articles on the Internet) found in a corpus (e.g., a collection or repository of content), an index database 122 that stores the index information, and a ranking engine 152 (or other software) to rank the resources that match the query 110. The indexing and ranking of the resources can be performed using conventional techniques. The search system also includes a clustering engine 154 to cluster resources according to individuals. Cluster identifiers can be included in the index database 122 or in a separate index, not shown. Alternatively, cluster identifiers can be identified at runtime. The search engine 130 can transmit the search results 128 through the network to the client device 104 for presentation to the user 102.

Figure 2:
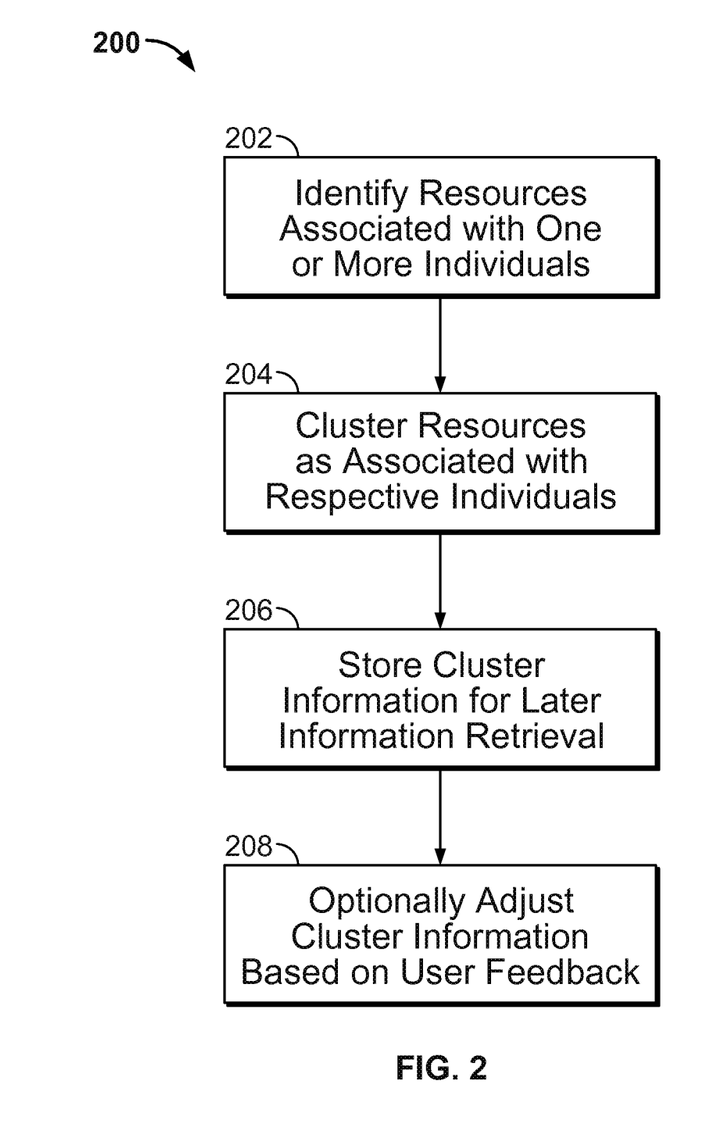
FIG. 2 is a flow diagram of an example process for people clustering.

FIG. 2 is a flow diagram of an example process 200 for people clustering. For convenience, the process 200 will be described with respect to a system including one or more computing devices that performs the process 200.

The system identifies resources associated with one or more individuals (202). Resources can be identified, for example, by searching an index of resources, for example, index database 122 described above with respect to FIG. 1. Alternatively, a separate index can be generated that indexes resources associated with individuals. Resources can be associated with individuals, for example, based on the individuals names occurring in resource content or metadata associated with resources. In some implementations, particular types of resources are associated with individuals, for example, user profiles (e.g., from social groups, businesses, or schools), user blogs, or images from image sharing sites.

The system clusters resources as associated with respective individuals (204). Various clustering techniques can be used to cluster resources. In some implementations, a simple clustering can initially group resources associated with the same name. For example, all resources associated with the name "John Smith" can be clustered together. In some other implementations, some variations in a name are allowed during clustering. For example, "John Smith" can be clustered with "John A. Smith". Similarly, spelling variations can be clustered together or treated as separate clusters, e.g., "John Smith" and "John Smyth".

Other clustering techniques can attempt to parse separate individuals who may share the same name so that each individual has an associated cluster of resources purportedly associated with that individual. For example, particular features of the resources can be used to attempt to identify particular individuals even if they have the same name. These features can identify, for example, links, name mentions, rare word mentions that can be used to identify particular resources associated with the same individual.

In some alternative implementations to the process 200, the system receives a set of clustering information (e.g., a clustering index) that has been previously generated. This index can include clusters and resources associated with each respective cluster.

The system stores cluster information for later information retrieval (206). Cluster information can be stored, for example, in a separate index database or table. In some implementations, each cluster has an associated cluster identifier. The cluster identifier is linked to resources that are members of the cluster. For example, the database or table can be keyed to the cluster identifier and identifying resources in the cluster. Alternatively, in some implementations, the index database includes a field for cluster identifier so that when resources are identified in response to a search query, any associated cluster identifiers can also be identified. In some implementations, cluster information is stored both in an index database and a cluster database. For example, the index database can be annotated with cluster identifiers (e.g., an indexed web page can have one or more cluster identifiers attached to it). Additionally, the cluster database can maintain cluster keyed information that also includes metadata identifiers (e.g., keywords, photo references, etc.).

The system optionally adjusts cluster information based on user feedback (208). In some implementations, clusters are periodically recomputed. In some other implementations, clusters are recomputed based on an amount of feedback received. In some implementations, clusters are continuously adjusted according to incremental feedback received from one or more users. In some other implementations, clusters are adjusted differently for different users (e.g., a user's feedback may be used immediately for just that user).

Users can provide feedback associated with presented search results. This feedback can be processed according to various criteria. In some implementations, the clustering information can be adjusted in response to the feedback. For example, if feedback is received that indicates that an search result is not associated with the cluster for a particular individual, the cluster information can be adjusted such that the search result is no longer clustered with the individual. For example, various weights in the clustering process (e.g., weights to a particular feature) can be adjusted such that the search result is demoted relative to the individual of the cluster. In another example, feedback can be received that indicates that individuals identified in two different clusters are actually the same individual. As a result, the two clusters can be joined into a single cluster for the individual. Additionally, new features can be generated based on the feedback.

In some implementations, individual feedback is insufficient to adjust cluster information. The feedback of multiple users can be aggregated and stored until a threshold amount of feedback has been obtained. Once enough feedback has been obtained, the feedback can be used to determine whether or not to adjust the clustering. For example, a weighted feature can be added to the clustering process that indicates that "these two pages are not about the same person", or "they are about the same person", which is then used by the clustering process to increase a score that would not cluster the two pages or would cluster the two pages, respectively.

Feedback and feedback processing is described in greater detail below with respect to FIG. 3. Responses to subsequent search queries associated with the cluster can rely on the updated cluster information in identifying search results to present to a requesting user.

Figure 3:
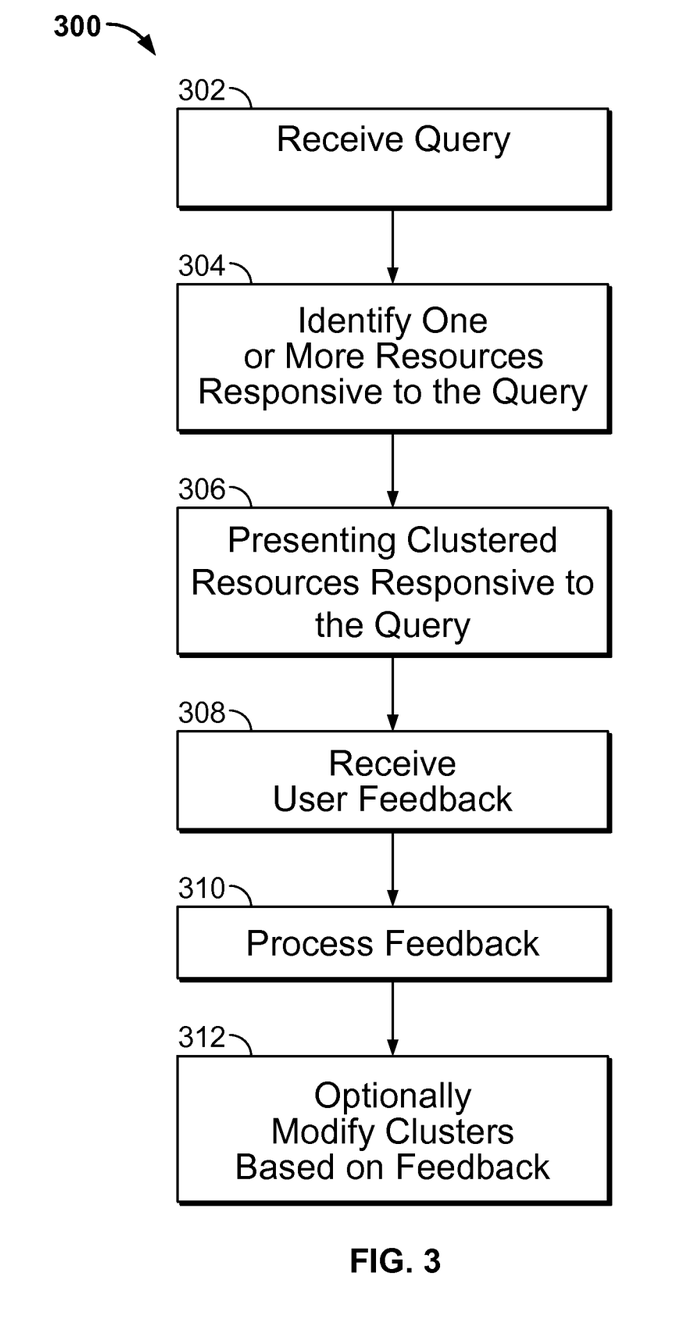
FIG. 3 is a flow diagram of an example process for adjusting people clusters based on user feedback.

FIG. 3 is a flow diagram of an example process 300 for adjusting people clusters based on user feedback. For convenience, the process 300 will be described with respect to a system including one or more computing devices that performs the process 300.

The system receives a search query (302). A search query can be provided within the field of a search interface. A search query includes one or more terms. The terms of the query are used to identify responsive results. A search query can be a people search query that includes an identifier associated with an individual (e.g., a name or other identifier). For example, the people search query can include a particular name as one or more query terms. The name can be a full name of an individual or a partial name (e.g., only a first name or last name). Alternatively, the identifier in the people search query can be a title (e.g., a job title), for example, "president of the united states". In some implementations, the search query does not have a particular people identifier, but the search results responsive to the query may still be associated with one or more individuals (e.g., from the cluster annotations to the index information associated with the respective search results, as described above).

In some implementations, the user enters the people search query directly into the search interface in a similar manner to entering any search query. In some other implementations, the user specifies that people search results are requested. For example, the user can select "people" in a search menu (e.g., in the search interface or as a refinement or filter option presented with the search results). Receiving the people search query can include receiving the people search filter or query refinement to an already submitted query.

The system identifies one or more resources responsive to the query (304). In particular an index database can be searched to identify resources responsive to the query. The resources identify one or more clusters to which the resources belong (e.g., clusters defined for particular names or individuals). For example, a cluster identifier can be associated with the resources in the index that identifies which cluster the resource is a member of.

In some implementations, one or more of the query terms correspond exactly with the cluster identifier (e.g., the query and the cluster identifier include the exact same name). In some other implementations, the query terms correspond with one or more terms in the cluster identifier (e.g., partial name, missing middle initial, etc.). For example, a query "John Smith" can correspond to the cluster identifier "John A. Smith" or vice versa. Thus, a partial match can still identify a correspondence between the query and the partially matched cluster identifier. In some implementations, a matching for spelling variations or spelling corrections is performed in identifying corresponding cluster identifiers. Thus, in some implementations, depending on the level of clustering, multiple cluster identifiers can correspond to an input query (e.g., both a cluster identifier "John A. Smith" and "John B. Smith" can correspond to the query "John Smith").

The system presents clustered resources responsive to the query (306). The resources responsive to the query can be presented according to cluster such that a result is presented along with one or more other results in the cluster. In some implementations, the additional results of the cluster are presented inline and indented from the other search results to visually identify the results as results of the cluster. The particular results representing each presented cluster can be presented according to a ranking of the search results responsive to the query. For example, a ranking that determines which search results are most relevant to the query. Relevance can be determined according to a number of factors alone or in combination. These factors can include degree of correspondence or matching between query terms and the resources, location, or level of social connection. Thus, search results are ranked and each presented search result in the ranked order can include one or more other search results from a corresponding cluster.

The system receives user feedback associated with a presented search result or cluster of results (308). In some implementations, each presented search result or cluster of search results includes an interface element that allows the user to provide feedback associated with the results. For example, for a cluster of results presented as associated with a particular individual, the user can provide feedback indicating that a search result of the cluster is incorrectly associated with the individual (e.g., the result belongs to someone else having the same name).

Various forms of feedback can be available in order to provide a way for users to indicate various types of information. Examples of the types of information users may wish to provide as feedback include: The resource (e.g., a picture) does not belong to the person indicated, the cluster contains resources about other people, there are multiple results (clusters) for the same person, the extracted information is incorrect, or about a different person. Additionally, a user can object to the information that is presented (e.g., picture, extracted information, pages), for example, because of another malicious user slandering them on a particular resource (e.g., a web page).

In some implementations, feedback is provided through a text field that allows the user to type in whatever feedback they want to convey. Alternatively, a feedback interface can also be generated to simplify the common types of feedback. For example, when a user requests to provide feedback they can be presented with a group of selectable feedback items asking about the particular search result. Examples of the selectable feedback for an image search result include: the picture isn't about this person, the picture is offensive, the related results aren't about this person, and this person appears more than once in the search results.

The system processes the feedback (310). The feedback can be processed individually or in combination with feedback from other users. For example, feedback on a particular search result from multiple users can be aggregated to provide a higher confidence in the feedback as being correct. Alternatively, the feedback can be used to confirm correct clustering. For example, the feedback can include the ability for user to confirm that the search result is correctly clustered (e.g., clustered search results all relate to the same individual). In some implementations, feedback is submitted to a human operator for evaluation either individually or when a threshold amount of feedback has been received.

The received feedback or the results of the processing can be stored for later use, for example during a later clustering (e.g., to adjust weights to features or generate new features in later clustering) or to aggregate with later received feedback on the same search result. Feedback records can be maintained for collecting and aggregating feedback over time. Feedback records can include various information useful in processing the feedback. The information can include information about the user's complaint, e.g., a type or content or feedback and a timestamp for receiving the feedback (e.g., the age of the feedback can be considered when determining the weight to give to the feedback in adjusting the clustering).

The information can also include user information, for example, information or indications as to the reliability or quality of the user's feedback. These can include a user identifier (e.g., based on verification of the identity of a user, for example, a user login to a profile or account), an age of the user account (e.g., is the feedback provided by a new user or established user), flags indicating social connection (e.g., is the user connected to the subject of the feedback), and location of the user. For example, feedback from a user having a higher social connection to the subject individual of the cluster can be viewed as having higher quality than the feedback of a user with a lower or no social connection since the user with a higher social connection is more likely to know if a resource is incorrectly clustered.

In some implementations, the name of the user submitting the feedback can be compared with the identity of the cluster being reported on. When the name matches, a higher quality can be assigned to the feedback. Additionally, reputation scores can be assigned to particular users. The reputation score can be used to determine the quality or reliability of submitted feedback. In some implementations, the reputation score is based on an evaluation of the quality of previously submitted feedback by the user (e.g., based on human evaluators or similar aggregated feedback).

The report can also include features of the cluster at issue including a cluster identifier, age of the cluster (e.g., how long has it been since the cluster was recomputed), and characteristics of the cluster including resource URL's and extracted facts.

In some implementations, the feedback is organized according to user so that the feedback from a single user is maintained together. For example, a feedback table can be used to store feedback from each user. In some implementations, the feedback table is keyed to user identifier. Each row is keyed by a hex64 representation of their user identifier. The table includes a timestamp indicating when the feedback was provided as well as resource and feedback information. The rows can have a fixed feedback limit. This will keep only the most recent N pieces of feedback for any one user (e.g., 100 pieces of feedback per user). Keying to user identifier makes it easy to remove data provided by a user when an account is deleted or invalid or when a user opts out of storing feedback. Additionally, keying to the user identifier collects all data provided by each particular user which can be used to weight the user's feedback. For example, user feedback can be weighted based on a reputation score of the user (e.g., a measure of how reliable the user's feedback is). Similarly, the feedback for a user later deemed unreliable can easily be removed.

In some other implementations, the feedback table is keyed to cluster identifier. Each row is keyed by the hex64 representation of the cluster identifier the feedback is being provided for. The table can include the identifier for the user providing feedback on the cluster. In some implementations, the table can also include an identifier of which cluster version the feedback is associated with (e.g., when clusters are periodically recomputed). For example, feedback for older clustering may be assigned a lower weight than more recent feedback. A timestamp can be recorded that is the time in which the feedback was provided. A table keyed to cluster identifier allows for all data written for a particular cluster to be analyzed.

The system optionally modifies clusters based on the feedback (312). For example, clusters can be modified so that particular search results are no longer included in the cluster. In some other implementations, clusters are modified to include additional search results that correspond to the individuals associated with the clusters or to remove search results that should not longer be included in the clusters. For example, there could be two clusters for the same individual based on name variations (e.g., nickname, middle name, pen name or stage name vs. real name). The resources associated with these two clusters can be combined into a single cluster in response to the feedback. In another example, incorrectly associated resources can be removed from a cluster in response to the feedback.

Feedback can be aggregated to improve confidence in the feedback prior to modifying clusters. For example, a particular threshold of feedback can be required before modifying a particular cluster.

In some alternative implementations, clusters are modified by adjusting weights to one or more features used in the clustering or by adding one or more new features based on the feedback. In some implementations, the features are specific to particular resources or clusters. In some other implementations, feedback is more general such that generated features are more generally valuable and can be used in broadly during clustering.

Alternatively, the feedback can be used as an additional clustering signal, the weight of which can depend on the number of consistent feedback responses from multiple users. For example, sparse feedback can be weighted lower than feedback that exceeds a threshold number of users. In some implementations, the weight depends on temporal or geographic patterns associated with the feedback. For example, sustained feedback may be more highly weighted than intermittent bursts. Similarly, widespread feedback may be more highly weighted than localized feedback. In some implementations, a variance in the feedback (e.g., do all users provide the same feedback on the resource or different feedback) is used in determining the weight. Additionally, an innate weight of the feature being commented on can be considered (e.g., the innate weight for feedback associated with a celebrity can be different from that associated with a regular individual).

Figure 4:
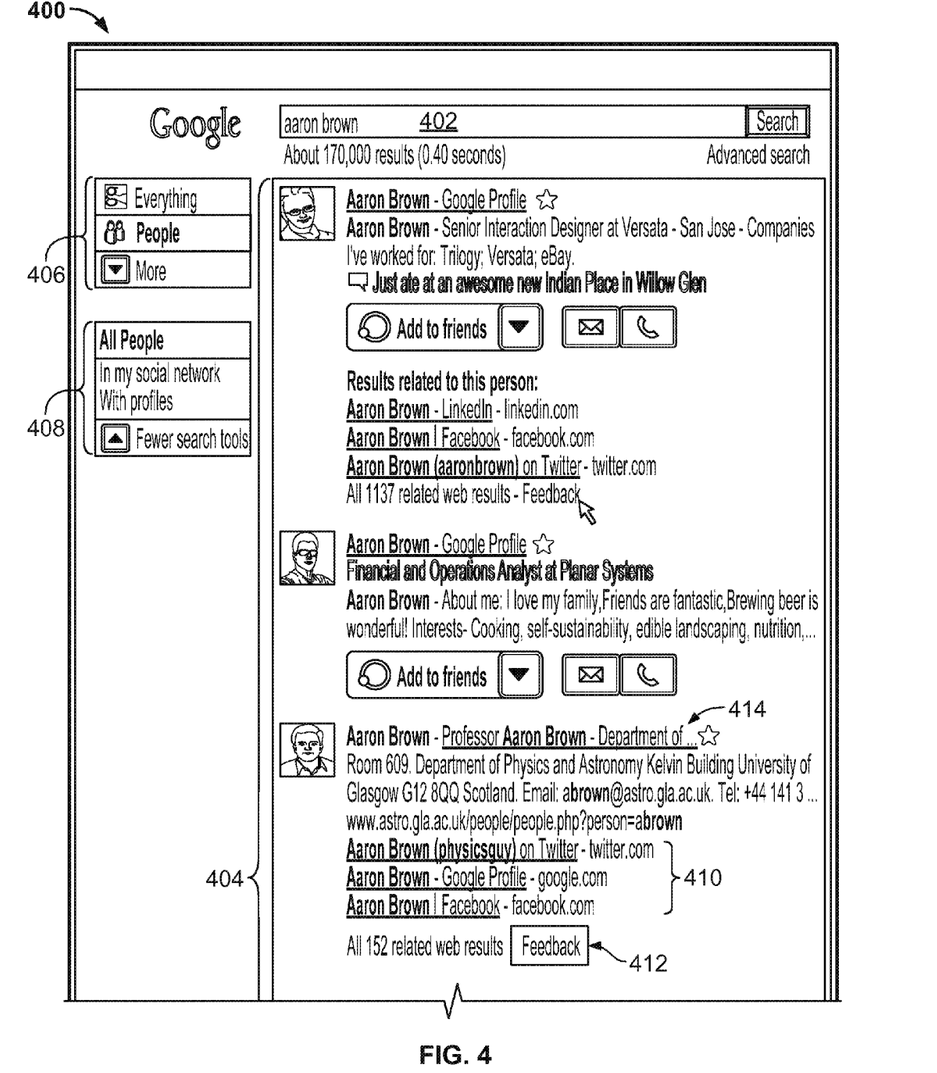
FIG. 4 is an illustration of a search results page including clustered people search results.

FIG. 4 is an illustration of a search results page 400 including clustered people search results. Search results page 400 represents a search results page presented to a user after entering a query into a search interface and selecting "people" as a filter for the search results. In particular, as illustrated in the search results page 400, the search query is shown in a search field 402. People search results 404 are presented in response to a selection of a "people" from result filters 406.

The result filters 406 allows the user to designate between search results limited to people only or general search results responsive to the query. Results limited to people, for example, can be a subset of all search results that include an individual identified in the search query. For example, particular types of content such as profile pages and social accounts can be presented in a people search but not book references or documents that refer to the name identified in the search query.

The people search results 404 include particular search results (e.g., a link to a resource and a corresponding snippet of content associated with the resource). For example, search result 414 identifies a faculty profile for a particular individual. The people search results 404 also include clustered search results 410. The clustered search results 410 are other search results in the same cluster (e.g., identified using a cluster identifier associated with each search result). Additional search results of the cluster can be displayed in response to a user request, e.g., a user selection of the link "all 152 related web results". Each cluster further includes a feedback element 412. In some implementations, search results 404 are ranked in part based on a social connection to the requesting user such that search results associated with users having a connection to the requesting user are positioned higher.

Additionally, as shown in search results page 400, other filtering options are available. For example, scope filter 408 allows the user to filter based on the user's relationship with the individuals identified in the search results. For example, all people can be shown, or only those having a relationship or connection to the user. Alternatively, only search results of individuals having profiles are presented. In some implementations, even when all people are presented, the presentation of search results can promote those that the user has a relationship with (e.g., as a ranking weight applied to those connected to the user).

Figure 5:
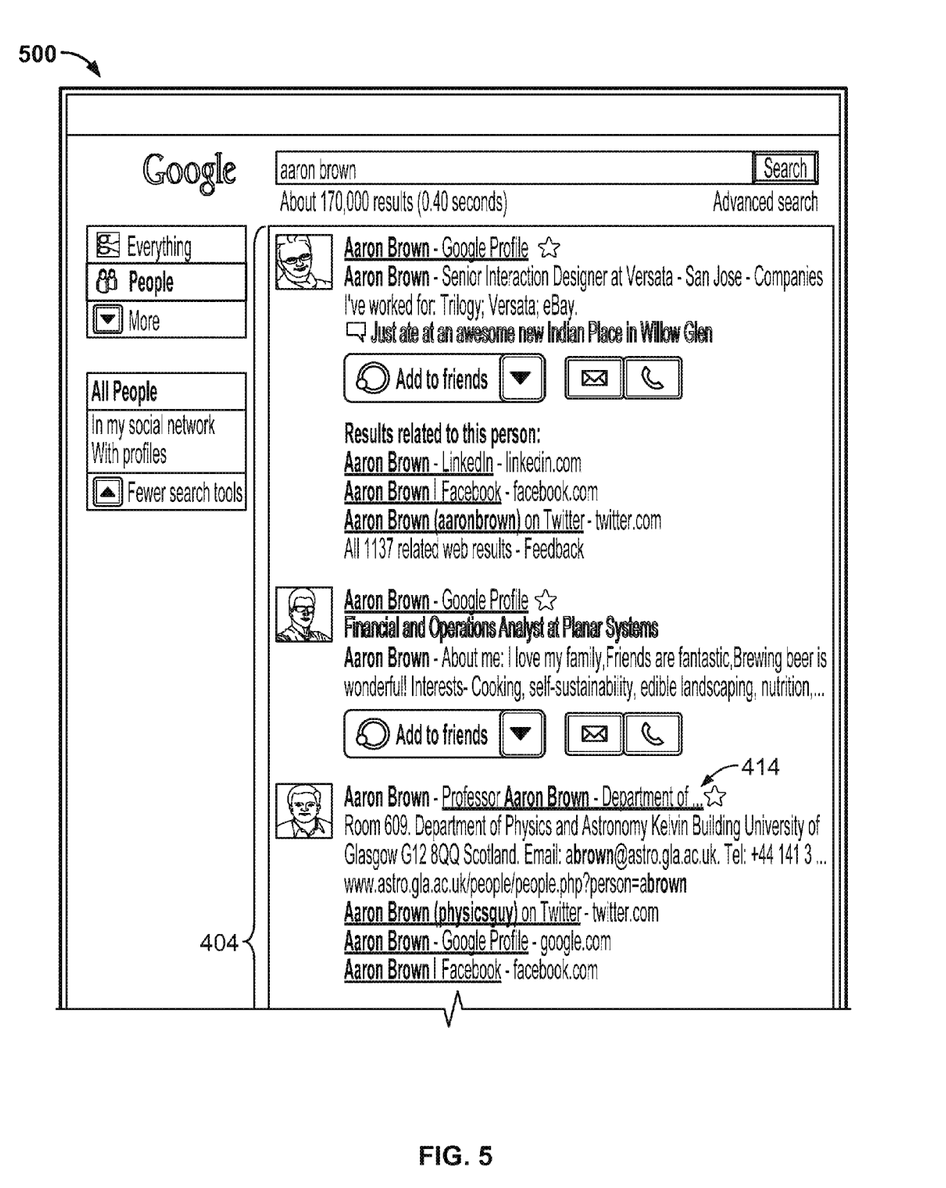
FIG. 5 is an illustration of a search results page including clustered people search result feedback options.

FIG. 5 is an illustration of a search results page 500 including clustered people search result feedback options. Search results page 500 includes the search results 404 from the search results page 400 of FIG. 4. However, the search result 414 now includes feedback options 502. For example, the feedback options 502 can be presented in response to a user selecting the feedback element 412 shown in FIG. 4.

The feedback options 502 includes selectable feedback choices from which the user can select and submit, e.g., to a search system. The feedback options 502 include both positive and negative feedback for the cluster. Specifically, the feedback options 502 include "This result is just perfect," "this result contains offensive content," "This result contains multiple Aaron Browns," "This is not a picture of this Aaron Brown," and "Other problem". In some implementations, when the user selects "Other problem" a text field is presented that allows the user to more specifically describe the feedback. The feedback "This result contains multiple Aaron Browns" can be used to identify search results having the same name but directed to different individuals so that they are no longer clustered together. Similarly, the feedback reporting an erroneous photo helps identify a cluster for the same individual. The positive feedback can be used to reinforce the correct clustering, for example, by increasing the confidence in the clustering result. In some implementations, the initial feedback triggers a request for additional feedback, for example, to identify which particular search results of the cluster should be assessed in view of the feedback (e.g., which result is incorrectly clustered). Other feedback options can be presented in addition to or instead of those shown in FIG. 5. For example, another feedback option can be "this is not a person" for results that are not associated with a particular individual.

Figure 6:
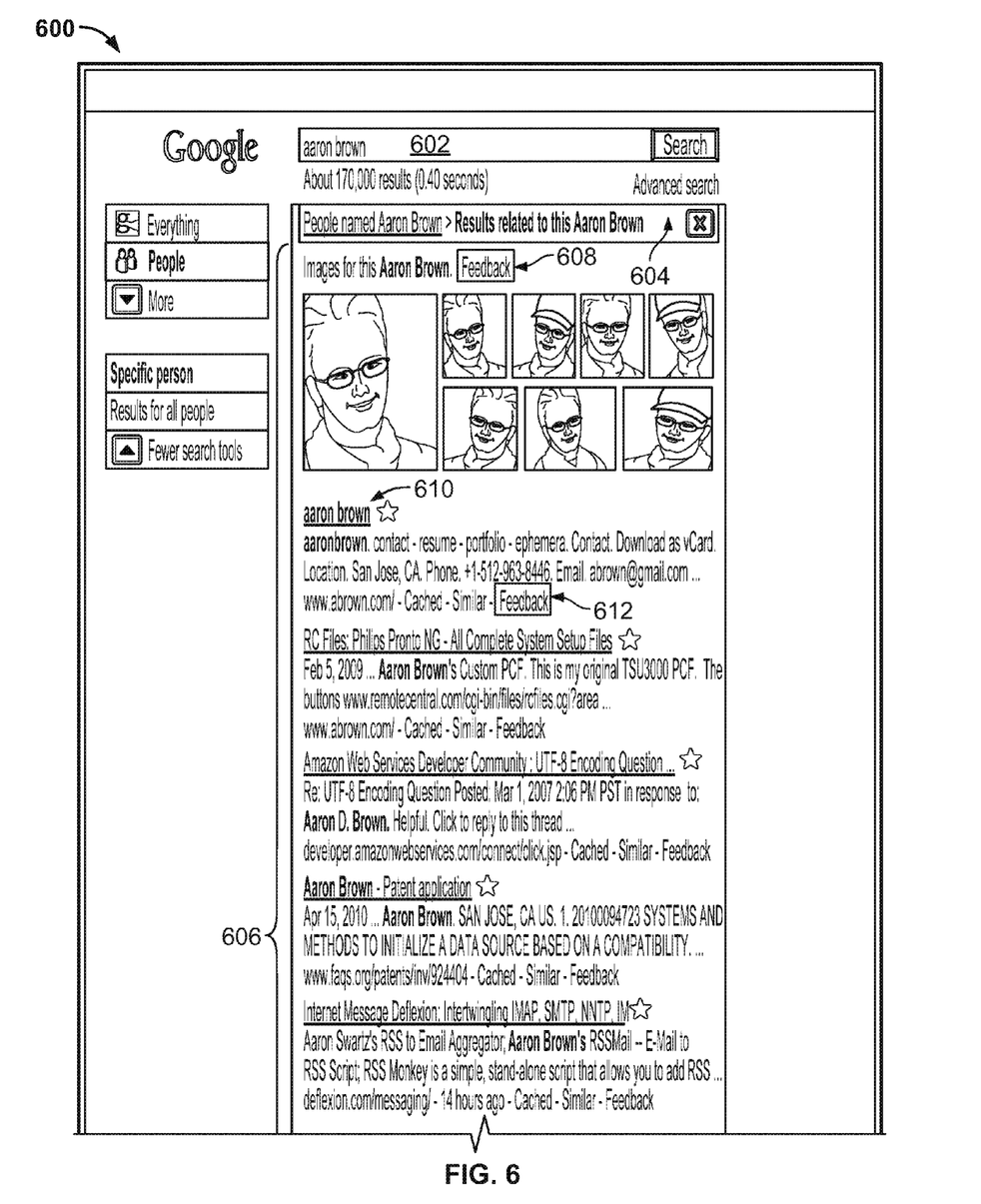
FIG. 6 is an illustration of a search results page including a people search result for an individual.

FIG. 6 is an illustration of a search results page including a people search results page 600 for an individual. In particular, the people search results page 600 includes search results 606 that are all purported to be related to a particular individual. For example, the user searched for a particular individual as shown in search field 602. The user is then presented with search results 606 related to a particular individual responsive to the search query.

In some implementations, the search results are initially presented for multiple individuals corresponding to the query as shown in FIG. 4. The user can then request related results for a particular individual such that the results for that individual are shown. Thus, as shown in FIG. 6, a search path 604 indicates a search for people having the given name and then results related to a particular individual. In some implementations, the user selects a link associated with the earlier portions of the path in order to view those results. For example, selecting the first portion of the path returns the user to a search results page, as shown in FIG. 4, including multiple individuals having the same name as responsive to the search query.

The individual results include images and web page results. Other types of search results can also be presented that are responsive to the query including, for example, results identifying audio or video resources. All of the search results 606 provide for additional feedback including feedback on images 608 and feedback to individual search results, for example, feedback element 612 of search result 610. Additionally, the people search results page 600 includes the ability to view search results related to other individuals matching the query 614.

Figure 7:
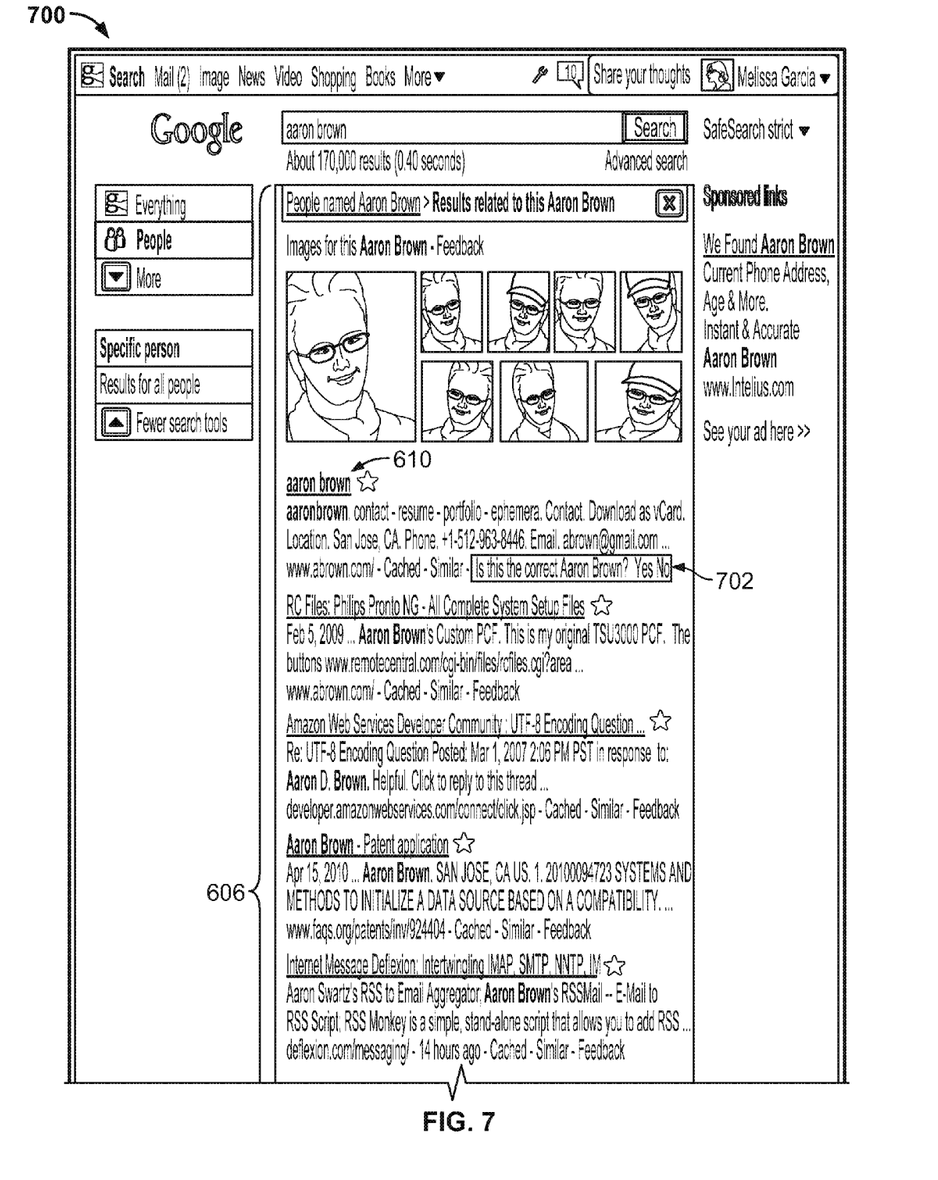
FIG. 7 is an illustration of a search results page including feedback for a people search result for an individual.

FIG. 7 is an illustration of a search results page 700 including feedback for a people search result for an individual. The search results page 700 includes the search results 606 from the search results page 600 of FIG. 6. However, the user has selected the feedback element 612 of FIG. 6. Therefore, the search result 610 now includes user selectable feedback 702. The user selectable feedback 702 allows the user to confirm whether or not the particular search result 610 identifies the correct individual. In particular, the user selectable feedback 702 includes yes and no options for the user to select. Other forms of feedback can be used, for example, a text field for user feedback or only providing an option for incorrect classifications (e.g., negative feedback but not positive feedback). The feedback can be processed to determine whether or not the search result 610 should be clustered with the other search results for the particular individual of the cluster.

In some implementations, users receive return feedback. For example, in response to particular given feedback the user can be provided feedback in return. The return feedback can be a displayed notice in the user interface, or new interface, that indicates the feedback has been received. In some implementations, a separate feedback interface can be associated with the user's profile or account such that the user can manage their feedback. For example, the user can view, modify, or otherwise manage the given feedback. Similarly, received return feedback can be displayed to the user. The return feedback can then be updated, for example, when the feedback is used in clustering or discarded. In some implementations, the return feedback is provided by e-mail to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a search query, the search query including one or more terms that include a name corresponding to one or more individuals;
   identifying a plurality of search results responsive to the query, wherein the plurality of search results includes a first search result, the first search result corresponding to a cluster of social media resources associated with a particular individual of the one or more individuals, and wherein each resource in the cluster of resources is associated with a corresponding cluster identifier that identifies the cluster of resources;
   providing for presentation the first search result and one or more other search results of the plurality of search results;
   receiving user feedback for the first search result that identifies the cluster of resources associated with the particular individual, wherein the feedback provides an indication of the accuracy of the cluster of resources; and
   processing the received feedback to determine whether to modify the cluster of resources associated with the particular individual, where the processing includes assigning a weight to the user feedback, where the weight of the user feedback is determined based at least on one or more factors associated with the user, and where the one or more factors include a level of a social connection between the user and the one or more individuals.

2. The method of claim 1, where receiving user feedback includes feedback indicating that the search result is incorrectly clustered.

3. The method of claim 1, where receiving user feedback includes flagging objectionable content in a clustered search result.

4. The method of claim 1, where receiving user feedback includes confirming the identity of the individual associated with the cluster of resources.

5. The method of claim 1, where processing the received feedback includes aggregating the feedback with feedback received from other users for the same search result.

6. The method of claim 5, where a determination is made to modify a cluster associated with the individual based on the overall weight of the aggregated feedback.

7. The method of claim 1, where the one or more factors associated with the user include a quality measure for the user.

8. The method of claim 1, where the one or more factors associated with the user include a reputation score of the user based on prior received feedback.

9. The method of claim 1, where processing the received feedback includes assigning the feedback to a human operator for evaluation.

10. The method of claim 1, where modifying a cluster includes adjusting cluster parameters such that one or more resources are no longer associated with a particular individual.

11. The method of claim 1, where modifying a cluster includes generating an additional feature to be used in the clustering.

12. The method of claim 11, where the additional feature specifies a relationship between particular resources.

13. The method of claim 1, further comprising:
   providing return feedback to the user in response to received user feedback.

14. A system comprising:
   one or more computing devices operable to perform operations comprising:
      receiving a search query, the search query including one or more terms that include a name corresponding to one or more individuals;
      identifying a plurality of search results responsive to the query, wherein the plurality of search results includes a first search result, the first search result corresponding to a cluster of social media resources associated with a particular individual of the one or more individuals, and wherein each resource in the cluster of resources is associated with a corresponding cluster identifier that identifies the cluster of resources;
      providing for presentation the first search result and one or more other search results of the plurality of search results;
      receiving user feedback for the first search result that identifies the cluster of resources associated with the particular individual, wherein the feedback provides an indication of the accuracy of the cluster of resources; and
      processing the received feedback to determine whether to modify the cluster of resources associated with the particular individual, where the processing includes assigning a weight to the user feedback, where the weight of the user feedback is determined based at least on one or more factors associated with the user, and where the one or more factors include a level of a social connection between the user and the one or more individuals.

15. The system of claim 14, where receiving user feedback includes feedback indicating that the search result is incorrectly clustered.

16. The system of claim 14, where receiving user feedback includes flagging objectionable content in a clustered search result.

17. The system of claim 14, where receiving user feedback includes confirming the identity of the individual associated with the cluster of resources.

18. The system of claim 14, where processing the received feedback includes aggregating the feedback with feedback received from other users for the same search result.

19. The system of claim 18, where a determination is made to modify a cluster associated with the individual based on the overall weight of the aggregated feedback.

20. The system of claim 14, where the factors associated with the user include a quality measure for the user.

21. The system of claim 14, where the one or more factors associated with the user include a reputation score of the user based on prior received feedback.

22. The system of claim 14, where processing the received feedback includes assigning the feedback to a human operator for evaluation.

23. The system of claim 14, where modifying a cluster includes adjusting cluster parameters such that one or more resources are no longer associated with a particular individual.

24. The system of claim 14, where modifying a cluster includes generating an additional feature to be used in the clustering.

25. The system of claim 24, where the additional feature specifies a relationship between particular resources.

26. The system of claim 14, further comprising:
providing return feedback to the user in response to received user feedback.

27. A non-transitory computer-readable storage medium encoded with a computer program, the program comprising instructions that when executed by data processing apparatus cause the data processing apparatus to perform operations comprising:

receiving a search query, the search query including one or more terms that include a name corresponding to one or more individuals;

identifying a plurality of search results responsive to the query, wherein the plurality of search results includes a first search result, the first search result corresponding to a cluster of social media resources associated with a particular individual of the one or more individuals, and wherein each resource in the cluster of resources is associated with a corresponding cluster identifier that identifies the cluster of resources;

providing for presentation the first search result and one or more other search results of the plurality of search results;

receiving user feedback for the first search result that identifies the cluster of resources associated with the particular individual, wherein the feedback provides an indication of the accuracy of the cluster of resources; and processing the received feedback to determine whether to modify the cluster of resources associated with the particular individual, where the processing includes assigning a weight to the user feedback, where the weight of the user feedback is determined based at least on one or more factors associated with the user, and where the one or more factors include a level of a social connection between the user and the one or more individuals.

* * * * *